Oct. 27, 1959   H. A. VOGEL   2,910,381
SYSTEM FOR COATING METALS WITH POLYURETHANE RESINS
Filed Feb. 27, 1957

INVENTOR.
HENRY A. VOGEL
BY
Oscar L Spencer
ATTORNEY

United States Patent Office 2,910,381
Patented Oct. 27, 1959

2,910,381

SYSTEM FOR COATING METALS WITH POLYURETHANE RESINS

Henry A. Vogel, Gibsonia, Pa., assignor to Pittsburgh Plate Glass Company, Allegheny County, Pa., a corporation of Pennsylvania Application February 27, 1957, Serial No. 642,745

7 Claims. (Cl. 117—75)

This invention relates to systems for protectively coating materials, such as metals, and it has particular relation to systems for protectively coating metals against prolonged action of corrosive agents, such as water or moisture, with or without added chemicals.

By way of illustration, the invention will be described as being applied to the coating of a container for aqueous media, such container being represented by way of example as being a sheet steel swimming pool.

In order to protect such metallic containers as are employed for holding aqueous media, such as water, sterilizing media, washing solutions, and the like, from corrosion it has been suggested to coat the surfaces with compositions comprising various vehicles, such as phenolic resins, alkyd resins, drying oils and similar media. However, these, for various reasons, have not proven to be satisfactory in actual service. Various types of failure are encountered and each material has been subject to one or more of these types. For example, some of the materials exhibit inadequate, or but temporary adhesion between the base metal and the coating film, or between plies of the coating material. Many of the coating media do not adequately resist the action of water when exposed to prolonged contact with the latter. Such films in prolonged contact with water or intermittent contact with water, are subject to rapid degradation and failure. In many instances, the resin vehicle constituting the films does not adequately protect the metal from the corrosive action of aqueous media or from chemicals dissolved in the media.

This invention comprises the provision of a system for coating metals, such as iron or steel, or aluminum or magnesium in which excellent adhesion is obtained between the metal and the film, or between the plies forming the film. The films obtained withstand moisture and other agencies of deterioration over prolonged periods of time and metals protected by the films are not subject to corrosion.

Fundamentally, the system comprises the provision of a coating system for iron, steel, with or without galvanizing, bonderizing or like treatment, aluminum or other suitable metals, in which a facing layer of a highly moisture resistant and chemically resistant polyurethane resin is bonded to a surface preparation layer of a polyvinylacetal type resin. In some instances, bonding between the facing layer and the surface preparation layer may be direct. That is, the surface preparation layer of the polyvinylacetyl resin may be applied directly to the metal base as a liquid solution of the resin in a suitable solvent. Subsequently, the solvent is evaporated and the liquid components forming the polyurethane resin are applied directly to the surface preparation layer. Direct application may be used in those instances where the requirements, such as resistance to corrosion exerted upon the base metal by the aqueous medium having contact with the coating, are not severe, or where prolonged resistance to corrosion is not required.

In those instances in which maximum resistance to the corrosion of the metal and general durability of the coating is to be attained, it is preferred to bond the polyurethane resin film to the surface preparation layer by means of an intermediate layer which preferably is a solution in a suitable solvent of a resin which is an interpolymer of a vinyl halide and a vinyl ester, said interpolymer preferably being hydrolyzed to a certain extent to provide available hydroxyls. If maximum durability and resistance to corrosion are to be attained, it is also desirable that the resin be pigmented with an anti-corrosive pigment such as red lead.

For a better understanding of the invention, reference may now be had to the accompanying drawing in which.

Figure 1:
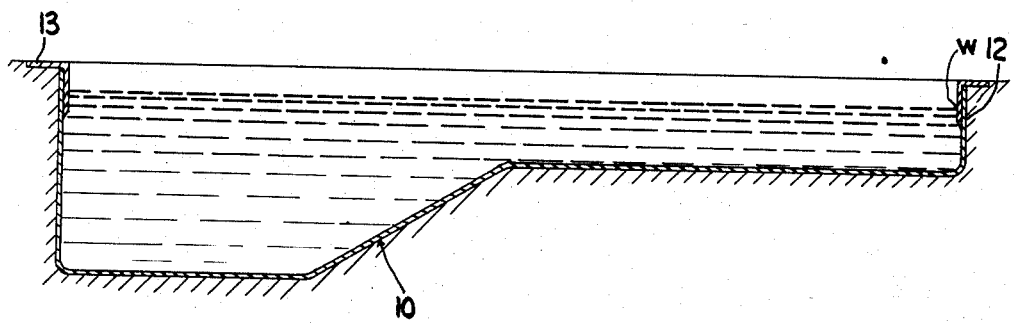
Fig. 1 illustrates the application of the principles of the invention to the internal coating of a sheet metal receptacle, which in this instance, may be considered as constituting a sheet metal swimming pool.

In the embodiment of the invention as shown in the drawings, a sheet metal article such as a swimming pool comprises a shell 10 of steel, sheet iron, aluminum or the like. The shell, if small, may be a stamping or casting; but if large, it preferably is fabricated from units of sheet metal appropriately secured together, as for example by welding or riveting. The particular method of fabricating this shell does not constitute a part of this invention and detailed description thereof is not deemed to be necessary. The external or outer surface of the shell preferably, is coated with a protective layer 11 which may be of a tarry or bituminous nature and being designed to protect the metal from the action of moisture or other agencies of deterioration. The shell is shown as being disposed directly in a suitable pit or excavation in the earth or other medium indicated at 12. Of course, the shell having the external coating could be supported by a suitable framework or by a backing of concrete, gravel, sand, cinders, or the like in the earth, but in general, such backing is not required and for purposes of simplicity it is omitted from the drawings. If desired, the shell may be provided with a marginal apron, such as is indicated at 13 in the drawings.

Figure 2:
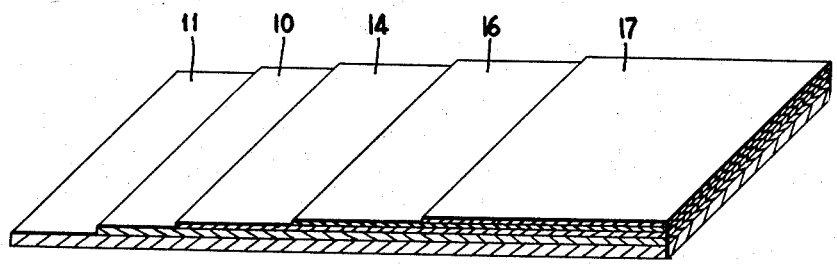
Fig. 2 is a small section of the metal illustrating in greater detail the arrangement of the several layers comprising the film.

Manifestly, films lining the container shown in Fig. 1 are very slight in thickness. For purposes of illustration, a small section through the several layers comprising the assembly showing the thickness of the films on an exaggerated scale is indicated in Fig. 2 of the drawings. In the construction as shown, the metal shell 10 is provided with a metals preparation coating or priming layer as indicated at 14 which may, as previously described, be from a solution of a polyvinylacetal type resin and being represented by polyvinylbutyral. Intermediate layer 16 may not always be required, but is shown by way of illustration and is preferred for maximum durability of the system. The layer 16 may be formed as from an appropriate solution of an interpolymer of a vinyl halide such as vinyl chloride and a vinyl ester such as vinyl acetate. Preferably, this intermediate layer contains free hydroxyls or reactive hydroxyls such as may be obtained by partial hydrolysis of an interpolymer resin. As already stated, the intermediate layer may include pigmentary materials such as red lead, which has been found in actual experience to be of assistance in preventing liquids from corroding the metal constituting the shell.

The external surface of the intermediate layer 16, in turn, is protected by an appropriate finishing layer 17 of a polyurethane resin such as may be obtained by the application of a liquid mixture of a polyester containing free hydroxyls and a polyisocyanate.

The polyisocyanate component which is mixed with the polyester preferably is a diisocyanate such as is represented by tolylene diisocyanate. It may be added directly to the polyhydric component at the time the film is to be formed or it may be added to an appropriate polyol to provide a liquid prepolymer containing reactive isocyanate groups and being suitable for incorporation with added polyester containing hydroxyls to provide a polyurethane finishing resin.

The preparation of the various components of the coating system are described more in detail in the subsequent examples of this application.

In the application of the coatings constituting the subject matter of this invention, it is desirable that the surface of the base metal should be freed of scale, rust, grease, and other agencies which could be expected to have an inadequate bond to the metal or which might interfere with the bond between the metal and the metals preparation coating to be applied. It is also desirable that any welds or seams between contiguous sections of metal be subjected to treatment to provide as smooth and uniform surface as possible. Especially satisfactory results may be obtained by subjecting the entire surface of the metal to be coated to a blasting operation with sand or other appropriate grit in order to remove any objectionable foreign matter, such as scale, rust, dirt, grease or the like. The surface is then ready to receive the metals preparation coat and the other coats making up the system of this invention. If preferred, the surface could also be treated as by phosphatization, e.g. by Bonderizing or Parkerizing, before the metals preparation coating is applied.

A container, such as a sheet metal swimming pool, water tank, or the like, which has been internally coated in the manner described is excellently adapted to resist the corrosive effects of liquids and notably of aqueous medium, a level of which is indicated at W in the drawings. The aqueous medium may be relatively pure, as for example, it may be water without added agencies. The water may be hard or soft. It may also include chemicals, such as chlorine, hypochlorous acid or the like in amounts to destroy or inhibit bacteria. Likewise, it may include alkalies and detergents and other agencies which could be expected to exert a deleterious effect upon the coating of the interior of the container.

Reference has been made to the coating of the interior of the receptacle. It is manifest that a similar coating may also be applied to the exterior thereof, in which instance, the bituminous or asphaltic or tar-like coating layer may be omitted or if preferred, the latter layer may also be applied over the top of a system comprising polyurethane resin as herein described as an external coating. The principles of the invention are not limited to the internal coating of swimming pools. Various other containers, such as water tanks, pickling baths, washing machine tubs, buckets and many other receptacles which are designed to contact with aqueous media with or without added chemicals and solvents may be satisfactorily coated with the systems herein illustrated. Also the invention is not limited to coating receptacles. Obviously, many articles, such as building frameworks comprising metal members subject to corrosion or panels employed in fabricating buildings where corrosion from moisture may be expected, provide good subjects for the application of the coating systems of this invention.

The preparation of typical compositions suitable for use in forming the several films in accordance with the provisions of the present invention will now be described in greater detail.

PREPARATION OF THE METALS PREPARATION COATING AND APPLICATION THEREOF

A composition suitable for use as the metals preparation film and which may also be termed a "wash primer" preferably comprises a solution of a polyvinylacetal resin, such as polyvinylbutyral in appropriate solvent media, such as one or more alcohols, for example a mixture of ethyl alcohol and butyl alcohol, or any other solvent of the resin.

The "washer primer" composition should also comprise a source of chromate ions and of phosphate ions. These require the presence of water and an acid in order to attain favorable pH value. By suitably blending the materials in the manner to be described, these favorable conditions can readily be attained. Suitable pigments which may be employed singly or in mixtures comprise:

Zinc tetroxychromate
Titanium dioxide
Talc
Pulverized aerogel
Carbon black and the like At least some zinc tetroxychromate is presently preferred.

The following constitutes a typical paste containing the polyvinylbutyral resin along with pigments, for use in the metal preparation, or wash primer composition:

Mixture A

| | Pounds |
|---|---|
| Zinc tetroxychromate | 61 |
| Titanium dioxide | 10 |
| Talc | 5 |
| Santocel C (pulverized aerogel [1]) | 5 |
| Carbon black | 1.4 |
| Polyvinyl butyral | 66 |
| Ethyl alcohol | 452 |
| Butanol | 155 |

[1] Aerogel is understood to be highly cellulated silica obtained from precipitated silica gel.

The foregoing composition provides a mixture of approximately 100 gallons volume. A thinner (Solution B) is also made up comprising:

Solution B

| | Parts |
|---|---|
| Isopropyl alcohol | 620 |
| Water | 42 |

The foregoing are but typical solvents and could be replaced by other solvents for the particular resin. The amounts of solvent are adjusted to give suitable brushability or sprayability to the solution. Acid and notably phosphoric acid should be included in the wash primer composition. The following constitutes a typical acid solution which in appropriate amount can be incorporated in the wash primer material.

Solution C

| | Pounds |
|---|---|
| Phosphoric acid | 120 |
| Isopropyl alcohol | 596 |

This mixture, likewise, constitutes approximately 100 gallons by volume.

Wash primer solution

Primers suitable for application directly to the metal are now available as commercial products. The preparation of these are discussed in the technical literature. One example of such literature is Bakelite Technical Release No. 11, on Polyvinyl Butyral Resin XYHL.

A typical wash primer or metals preparation composition is made up to comprise Components A, B and C in the proportions:

| | Parts by volume |
|---|---|
| Mixture A | 4 |
| Thinner (Solution B) | 2 |
| Acid solution (Solution C) | 1 |

It comprises as its main vehicular solids ingredient the polyvinyl butyral resin. The latter could be replaced by other polyvinyl acetyl resins.

Before this composition is applied, as previously indicated the metal 10 is cleaned, as by brushing or sand blasting. It should also be free of moisture.

The mixture of Components A, B and C may be applied to the metal 10 as the wash, or primer coating 14, by spraying, by brushing, by roller coating, or by other appropriate techniques. It will dry within a period of about 1 hour, even at atmospheric temperature to provide a film which firmly adheres to the surface of the metal. Application of heat to speed up drying is not precluded.

THE INTERMEDIATE COATING AND ITS APPLICATION

In order to provide an intermediate layer 16 upon the metals preparation composition, a composition is made up comprising as its main vehicular solids component an interpolymer of vinyl acetate and vinyl chloride which also includes hydroxyls. One such interpolymer is sold under the trade name of Vinylite VAGH. This is understood to be a partially hydrolyzed interpolymer calculated as 91 percent vinyl chloride and 3 percent vinyl acetate. Most of the rest is hydroxyl. Solvents for this composition may comprise methyl isopropyl ketone diluted with toluene. Plasticizers, such as phthalates, esters, etc. as tricresyl phosphate may also be included, if so desired, but are not strictly necessary to the invention.

A solvent should be provided in order to impart fluidity to the system. Often the solvent medium comprises a blend of two or more solvents or diluents.

In many instances a pigment such as red lead is also included. The solvents and pigments may be incorporated in amounts to impart desired consistency to the composition.

The following constitutes a typical intermediate coating composition 16:

*Intermediate coating solution*

| | Pounds |
|---|---|
| Vinylite VAGH | 143 |
| Tricresyl phosphate | 27 |
| Methyl isopropyl ketone | 285 |
| Toluene | 285 |
| Red lead pigment | 207 |

Other non-reactive volatile solvents than methyl isopropyl ketone and toluene may be employed. These are volatile components and largely disappear in the final film. The red lead has been found to be one of the best pigments, although it may be eliminated or replaced by other pigments. The composition is spread to form film 16 in one, two or more applications and is then allowed to dry for a reasonable time, e.g. 1 to 4 hours or longer, at room temperature or thereabout, as may be convenient. It is then ready to receive the polyurethane finishing coat 17.

PREPARATION OF THE FINISHING FILM

The preparation of polyurethane compositions suitable for application over the intermediate film above described will now be described in greater detail. Basically, the finishing film 17 comprises as its vehicular solids component polyurethane resin which is obtained by mixing a hydroxyl containing polyester component (1) with an organic polyisocyanate component (2). These two components which react to form the vehicular solids of the surface film may be maintained out of contact with each other for as long as possible in order to prevent possibility of premature setting or gelling. A convenient method of obtaining mixing is by spraying the two components concurrently, but from separate orifices upon a common surface. Such spraying assures that premature gelation does not occur. It is also feasible to mix the two components and quickly to spray, brush or otherwise apply the mixture to the surface coating. Various di- and polyhydric components may be employed in making up the polyurethane resin. Suitable polyhydric components for preparation of the polyester are:

Ethylene glycol
Diethylene glycol
Polyethylene glycol
Propylene glycol
Butanediol-1,3
Dipropylene glycol Triols and polyols such as:

Glycerol
Pentaerythritol
Trimethanol ethane
Hexane triol-1,3
Castor oil

Mixtures of the polyhydric alcohols and the dihydric alcohols are often used.

These acohols are reacted with dicarboxylic acids such as:

Phthalic acid
Isophthalic acid
Tetrephthalic acid
Succinic acid
Adipic acid
Sebacic acid or the like, or mixtures of two or more of the same and reacted to provide polyesters having acid numbers preferably below about 10 and hydroxyl numbers of about 40 to 400, dependent upon the hardness and other properties desired in the final films. It is often desirable to mix two or more polyesters, one being of lower hydroxyl number and the other being of higher hydroxyl number. The following example illustrates the use of a blend of such polyesters.

An appropriate illustrative polyester suitable for use in the interpolymerizable mixture forming the polyurethane resin may be made up from the following mixture:

*Polyester X*

| | Moles |
|---|---|
| Adipic acid | 3 |
| Glycerine | 1 |
| Butanediol-1,3 | 3.6 |

This mixture is cooked to evolve water and form a polyester. Preferably the cooking operation is halted when the polyester has a hydroxyl value of approximately 135 and is still liquid and soluble.

A second polyester, hereinafter termed (Y) may be made up from the following mixture:

*Polyester Y*

| | Moles |
|---|---|
| Phthalic acid | 2.5 |
| Adipic acid | 12.5 |
| Butanediol-1,3 | 9 |
| Trimethanolethane | 12 |

This mixture is also cooked in well known manner to provide a polyester which is of a hydroxyl value of 260–270, is liquid and is adapted to react with isocyanate groups in the formation of a polyurethane resin. These polyesters may be employed separately as a polyhydric compound for reaction with a polyisocyanate, or they may be mixed together and then the mixture reacted with an isocyanate in well known manner.

The polyester components may be employed with, or without pigmentation. Usually they are made up with volatile solvents such as methyl isopropyl ketone, xylol, Cellosolve acetate and the like, to obtain appropriate fluidity for spraying or other desired techniques of application and to obtain desired volatility of the volvent medium. These volvents disappear in the final film.

Likewise, they may be made up with tinting agents in well known manner to obtain desired tint or color.

The following illustrates the preparation of a so-called pigmented paste suitable for mixing with the other components in forming a finishing coat on a steel swimming pool or other metal article and comprising a blend of a polyester of high hydroxyl content and a polyester of lower hydroxyl content. The paste (P) is made up to comprise the following ingredients in the proportions specified:

Paste P

| | Pounds |
|---|---|
| Titanium dioxide | 1,000 |
| Polyester (as in X) | 330 |
| Polyester (as in Y) | 330 |
| Zinc Naphthenate | 6 |

This composition is ground in a pebble mill to disperse the pigment. This paste is then further incorporated with additional amounts of polyesters to provide component or Package 1 of the polyurethane finishing coating. The proportions in the composition are:

Package 1 of the finishing coat

| | Pounds |
|---|---|
| Paste P | 580 |
| Polyester X | 205 |
| Polyester Y | 205 |

A wide range of proportions of Paste P, Polyester X or Polyester Y is permissible. Paste P can be dispensed with, but usually is desirable. Polyesters X and Y can be used singly or in any desired blend. The polyesters are anhydrous or nearly so.

These are the essential solids-forming ingredients of the polyester. However, tinting agents and surfactants, such as liquid, soluble, organic silicon resin, e.g. DC–200 distributed by the Dow Corning Corporation, and other minor ingredients may be added in small amounts. In the foregoing mixture of Paste P and Polyesters X and Y, three pounds of DC–200 is quite adequate. The foregoing mixture constitutes the polyhydric component of the polyurethane resin and may be termed Package 1.

Package 2 of the finishing coat

The second solids-forming component (Package 2) of the polyurethane surface film comprises an organic isocyanate having a plurality of isocyanate groups. Generally, the isocyanate compound, at least comprises a diisocyanate which is typically represented by a tolylene diisocyanate, e.g. Hylene TM, which is understood to be a mixture of about 80 parts by weight 2,4-tolylene diisocyanate and 20 parts of 2,6-tolylene diisocyanate; or Hylene 65 which is understood to be 65 percent by weight of the 2,4-isomer and 35 percent of the 2,6-isomer or liquid prepolymers thereof with a portion of the di- or polyol component of the final resin.

Package 2 comprising the polyisocyanate may be made up to comprise organic diisocyanates, such as tolylene diisocyanate in an appropriate amount to react with the ester component. The diisocyanate may also include volatile solvents diluents, such as xylene, toluene, ethyl acetate, Cellosolve acetate, and the like. These solvents are non-reactive, but they improve the fluidity of the mixture and are desirable for spraying operations. They evaporate during curing. Solvents containing water or free OH groups should be avoided.

Diisocyanates such as tolylene diisocyanates tend to be volatile and to produce atmospheric contamination. In order to reduce this tendency, it is frequently desirable preliminarily to react an excess thereof with a portion of a polyhydric compound such as apolyester of a polybasic acid and polyhydric alcohol or with a polyol such as 1,4-butanediol, trimethylol propane, 1,2,6-hexanetriol, or the like, to provide a liquid prepolymer in which a portion of the isocyanate groups are reacted. These prepolymers are more convenient to handle than the diisocyanate. An appropriate prepolymer for use in forming the finishing coat on a swimming pool comprises as its constituents:

Diisocyanate prepolymer

| | Moles |
|---|---|
| Tolylene diisocyanate | 5 |
| 1,4-butanediol | 1 |
| Trimethylol propane | 1 |

The mixture can be reacted to form a liquid prepolymer, by heating, or by allowing it to stand. The product comprises polymers containing a plurality of isocyanate groups per molecule and is adapted to react with polyesters containing hydroxyls to form solid, thermoset, chemically resistant, polyurethane resins. The tolylene diisocyanate mixture, if used, may be comprised of 65 percent 2,4-isomer and 35 percent 4,6-isomer. A convenient commercial prepolymer which is substantially equivalent to the foregoing prepolymer is sold as Mondur C. This is understood to comprise 3 moles of the tolylene diisocyanate mixed isomers reacted with 1 mole of hexanetriol.

The isocyanate is employed in equivalency or preferably in slight excess of equivalency with respect to the hydroxyls of the polyester. A rule for calculating proportions involves divisions of 56,100 by the combined hydroxyl and acid numbers of the polyester. The quotient is the isocyanate equivalency, and in parts by weight, represents a unit weight of polyester. This weight of resin is reacted with about unit weight (174 parts by weight) of tolylene diisocyanate. Since the latter is often relatively volatile it may be employed in sufficient excess to compensate for such loss.

The following is an example of a composition comprising the polyisocyanate component in the form of a prepolymer as above described:

Package 2

| | Pounds |
|---|---|
| Xylol | 70 |
| Toluol | 35 |
| Ethyl acetate | 35 |
| Cellosolve acetate[1] | 510 |
| Mondur C (isocyanate prepolymer) | 524 |

[1] Cellosolve acetate-monoethyl ether of ethylene glycol.

This formation comprises 100 gallons of mixture and is suitable for incorporation as Package 2 with the polyester Package 1 mixture herein before described. The two packages may be mixed in equal volumes and applied as coat 17 to intermediate coat 16 by spraying or by brushing or by rolling.

EXAMPLE I

A surface of a sheet metal article, namely a tank representing a swimming pool, is cleaned as well as practicable of rust, scale or other covering material by means of a sand blast. The clean, bare surface is then coated with a thin film (e.g. a film of about 0.3 to 0.5 mil thickness) of wash-primer comprising polyvinyl butyral resin as its vehicular solids component. The film is indicated as 14 in the drawing and being of a composition heretofore designated as wash primer solution. This film is dried at atmospheric temperature.

The wash-primer film is followed by an intermediate film 16 comprising interpolymer of vinyl chloride and vinyl acetate and containing available hydroxyls. The composition corresponds to that heretofore designated as Intermediate Coating. One or a plurality of these films may be applied. The intermediate coating is dried, for example at room temperature to provide a film of about 1.5 mils thickness and is then ready to receive the finishing film 17 which is applied in an appropriate manner as for example as a spray or by brushing.

The finishing film is allowed to cure at room temperature to provide a coating system comprising the several films 14, 16 and 17 tightly adherent to each other and being well bonded to the metal beneath.

The total film thickness is generally over 4 mils, preferably 6–7 mils to assure sufficient protection over "high spot" of the sand-blasted surface. The system will resist the action of water in the pool for months without disintegration and without film separation. There is also but little tendency for the metal surface to rust.

In the finishing coat of the preceding example, the polyester component of the mixture may be replaced in part or totally by an equal or substantially equal amount of other polyester such as one of the following composition:

| | Parts by weight |
|---|---|
| Butanediol | 23.0 |
| Trimethylol ethane | 12.2 |
| Adipic acid | 23.6 |
| Phthalic anhydride | 16.2 |
| Isopropyl alcohol | 21.7 |

The mixture is cooked to provide a polyester of approximately the following characteristics:

| | |
|---|---|
| Percent by weight solids | 75±1. |
| Solvent | Isopropyl alcohol. |
| Viscosity | S–V (Gardner). |
| Color | 6 (maximum). |
| Acid value | 4 (maximum). |
| Moisture content | 0.2 (maximum). |
| Hydroxyl value | 122–130. |
| Hydroxyl equivalent | 450. |

The Mondur C isocyanate requirement per 100 grams of polyester is 70 grams. This provides a 10 percent stoichiometric excess of isocyanate.

This polyester is of well balanced properties and the isocyanate requirement thereof is substantially lower than for those previously described. Solutions thereof of relatively high solids content can be formed. The film obtained has good hardness, good adhesion and good resistance to moisture.

Still another polyester which may be used comprises:

| | |
|---|---|
| Butanediol | 28.1 |
| Adipic acid | 40.5 |

The mixture is cooked to a hydroxyl number of about 49.3 and an acid value of 6.4. This polyester may be used singly or in mixture with any one of, or all of the foregoing polyesters in forming the Package 1 of the finishing coat. One or a plurality of applications may be made in forming the finishing coats.

I claim:

1. A process of forming a tough, adherent, chemically resistant surface coating upon metal comprising the steps of applying to the metal a liquid surface preparation coat containing phosphoric acid and the solids of the vehicle of which consist essentially of a film-forming polyvinylbutyral adapted to dry under atmospheric conditions, drying the liquid surface preparation coating, applying to the surface preparation coating a liquid intermediate coating, the solids of the vehicle of which consist essentially of a film-forming vinyl chloride-vinyl acetate interpolymer containing available hydroxyl groups and being pigmented with red lead, drying said coating and applying thereto a finishing coating the solids-forming constituents of the vehicle of which consist essentially of an organic diisocyanate and a saturated liquid polyester of a polyhydric alcohol and a polycarboxylic acid, said polyester being free of ethylenic groups and containing free hydroxyls, and then curing the latter coating.

2. A process of forming a tough, adherent, chemically resistant surface coating upon a metal comprising the steps of applying to the metal a liquid surface preparation coating containing phosphoric acid and the solids of the vehicle of which consist essentially of a film-forming polyvinylbutyral resin adapted to dry under atmospheric conditions, drying the liquid surface preparation coating, applying to the surface preparation coating a liquid intermediate coating the solids of the vehicle of which consist essentially of a film-forming vinylchloride-vinylacetate interpolymer which has been partially hydrolyzed to provide free hydroxyls, the latter coating being pigmented with red lead, drying said intermediate coating and applying thereto a finishing coating the solids-forming constituents of the vehicle of which consist essentially of an organic diisocyanate and a liquid polyester of a polyhydric alcohol and a polycarboxylic acid, said polyester being free of ethylenic groups and containing free hydroxyls and allowing the mixture to cure to hard, thermoset state.

3. A process of forming a tough, adherent, chemically resistant surface coating upon metal, comprising the steps of applying to the metal a liquid surface preparation coating containing phosphoric acid and zinc tetroxychromate, the solids of the vehicle of which consist essentially of a film-forming polyvinylbutyral resin in solution and being adapted to dry under atmospheric conditions, applying to the surface preparation coating a liquid intermediate coating, the solids of the vehicle of which consist essentially of a film-forming interpolymer of vinylchloride-vinylacetate, said interpolymer containing free hydroxyls and being pigmented with red lead, drying said intermediate coating and applying thereto a finishing coating the solids of the vehicle of which consist essentially of an interpolymer of tolylene diisocyanate and a liquid polyester of a polyhydric alcohol and a polycarboxylic acid, said polyester being free of ethylenic groups and containing free hydroxyls and curing the latter coating.

4. A process of forming a tough, adherent, chemically resistant surface coating upon the interior of a steel container for water, comprising the steps of applying to the surface of the metal a liquid surface preparation coating containing phosphoric acid and the solids of the vehicle of which consist essentially of a dispersion of a film-forming polyvinylbutyral resin adapted to dry under atmospheric conditions drying said liquid surface preparation coating at said atmospheric temperature, applying to the surface preparation coating a liquid intermediate coating, the solids of the vehicle of which consist essentially of a film-forming vinylchloride-vinylacetate interpolymer, said interpolymer being partially hydrolyzed to provide available hydroxyls and further being pigmented with red lead, drying said intermediate coating and applying thereto a finishing coating the solids-forming constituents of the vehicle of which consist essentially of tolylene diisocyanate and a liquid polyester of a polyhydric alcohol and a polycarboxylic acid, said polyester containing available hydroxyls and being free of reactive ethylenic groups and curing the latter coating.

5. As an article of manufacture, a metallic object having a coating of tough, adherent, chemically resistant material comprising a primer containing phosphoric acid and zinc tetroxychromate and the solids of the vehicle of which, consist essentially of a dried film-forming polyvinylbutyral, an intermediate coating the solids of the vehicle of which, consist essentially of a film-forming vinylchloride-vinylacetate interpolymer, said interpolymer containing available hydroxyls and being pigmented with red lead, said intermediate layer being dried and further coated by a cured coating, the solids of the vehicle of which consist essentially of an interpolymer of a diisocyanate and a liquid polyester of a polyhydric alcohol and a polycarboxylic acid, said polyester containing available hydroxyls and being free of ethylenic groups.

6. A receptacle adapted to contain water and being formed of sheet steel and having a tough, adherent, chemically resistant internal coating upon the metal comprising a priming coating containing phosphoric acid and the solids of the vehicle of which consist essentially of a film-forming polyvinylbutyral resin dried under atmospheric conditions, and a dried intermediate coating, the solids of the vehicle of which consist essentially of a film-forming interpolymer of a vinylchloride-vinylacetate, said interpolymer being pigmented with red lead and further containing free hydroxyls said intermediate coating being covered by a cured finishing coating the solids of the vehicle of which consist essentially of an interpolymer of tolylene diisocyanate and a liquid polyester of a polyhydric alcohol and a polycarboxylic acid, said polyester containing available hydroxyls being free of ethylenic groups.

7. In a process of applying a coating to metal, said coating being resistant to moisture, the steps of applying to the metal a priming coating of a solution containing phosphoric acid and the solids of which consist essentially of a polyvinylbutyral resin under atmospheric conditions drying the priming coating, applying to the priming coating an intermediate coating the solids of the vehicle of which consist essentially of a film-forming interpolymer of vinylchloride and vinylacetate, said interpolymer containing available hydroxyls and being pigmented with red lead, drying the intermediate coating and then further coating the intermediate coating with a liquid composition the solids-forming constituents of which consist essentially of a solution of tolylene diisocyanate and a polyester of a polyhydric alcohol and a polycarboxylic acid said polyester being free of ethylenic groups and containing free hydroxyls and curing the latter composition.

References Cited in the file of this patent

UNITED STATES PATENTS

| | | |
|---|---|---|
| 2,158,111 | Doolittle | May 16, 1939 |
| 2,277,083 | Dorough | Mar. 24, 1942 |
| 2,403,077 | Hershberger | July 2, 1946 |
| 2,430,479 | Pratt et al. | Nov. 11, 1947 |
| 2,709,664 | Evans | May 31, 1955 |
| 2,760,953 | Seeger | Aug. 28, 1956 |
| 2,785,150 | Kreider et al. | Mar. 12, 1957 |

FOREIGN PATENTS

| | | |
|---|---|---|
| 557,243 | Great Britain | Nov. 11, 1943 |

UNITED STATES PATENT OFFICE
CERTIFICATE OF CORRECTION

Patent No. 2,910,381                      October 27, 1959

Henry A. Vogel

It is hereby certified that error appears in the printed specification of the above numbered patent requiring correction and that the said Letters Patent should read as corrected below.

Column 4, line 5, for "washer" read -- wash --; column 6, line 74, for "volvent" read -- solvent --; line 75, for "volvents" read -- solvents --.

Signed and sealed this 13th day of September 1960.

(SEAL)
Attest:

KARL H. AXLINE                      ROBERT C. WATSON
Attesting Officer                  Commissioner of Patents